United States Patent [19]
Arrington

[11] 4,113,619
[45] Sep. 12, 1978

[54] WASTE FLUID TREATMENT SYSTEM

[75] Inventor: James R. Arrington, Muskego, Wis.

[73] Assignee: Arrington Co., Inc., Muskego, Wis.

[21] Appl. No.: 343,733

[22] Filed: Mar. 22, 1973

[51] Int. Cl.$^2$ .......................... C02B 3/06; C02B 1/20
[52] U.S. Cl. .......................... 210/96 R; 210/195 R;
210/199; 210/202; 210/205; 210/257 R;
210/258
[58] Field of Search .............. D23/2, 3; 137/255, 259,
137/265, 376, 377, 343, 571, 572; 210/60, 85,
89, 96, 139–142, 195, 199, 200–202, 205, 252,
253, 257, 258; 220/20, 23.8, 85 S

[56] References Cited

U.S. PATENT DOCUMENTS

| | | | |
|---|---|---|---|
| 2,477,815 | 8/1949 | Mallory | 210/195 |
| 2,560,949 | 7/1951 | Harmon | 137/255 |
| 2,788,899 | 4/1957 | Cover | 210/195 X |
| 3,237,645 | 3/1966 | Frolich | 210/189 |
| 3,382,981 | 5/1968 | Hampton | 210/258 X |
| 3,446,732 | 5/1969 | Gasser et al. | 210/61 X |
| 3,715,308 | 2/1973 | Sulfaro et al. | 210/60 |
| 3,716,485 | 2/1973 | Robertson | 210/60 X |

FOREIGN PATENT DOCUMENTS 107,537  10/1898  Fed. Rep. of Germany ..... 137/571

OTHER PUBLICATIONS

Industrial Water & Wastes, Oct. 1960, p. 142.

Primary Examiner—Charles N. Hart
Assistant Examiner—Robert H. Spitzer
Attorney, Agent, or Firm—Michael, Best & Friedrich

[57] ABSTRACT

Disclosed herein is a system for chemically treating a waste water including a storage tank, a reaction tank, and a pump for transferring the waste water from the storage tank to the reaction tank. Conduits connecting the pump to the tank and control valves controlling the flow through the conduits are arranged so that, by coordinated actuation of the valves, the pump recirculates the waste water through the reaction tank to provide intermixing of the treatment chemicals and discharges the waste water from the reaction tank after treatment. The chemical reagents are introduced into the system on the suction of the pump so that gravity feed or separate pumping means is not required for the reagents. The tanks are preferably circular and mounted in a spaced relationship on a common base forming the bottoms thereof. Equipment for controlling the operation of the pump, the control valves, and the addition of the reagents are carried on a control panel which is mounted on a vertical panel extending between and mounted tangentially on the tanks.

3 Claims, 2 Drawing Figures

WASTE FLUID TREATMENT SYSTEM

BACKGROUND OF THE INVENTION

This invention relates to chemical treatment of waste waters and, more particularly, to systems for chemically treating waste waters from metal treatment processes.

The waste water from various metal treatment processes, such as plating, cleaning, pickling, anodizing and the like, contain polluting constituents, such as hexavalent chromium and cyanides, which must be removed or chemically modified before the water can be safely disposed. Such waste waters are usually treated with reagents which chemically destroy the noxious constituents. For instance, waste waters from a metal plating process containing hexavalent chromium are treated with a reducing reagent and an acid under conditions whereby the hexavalent chromium is reduced to trivalent chromium. Waste waters from an anodizing process containing cyanides are treated with a oxidizing agent and a base under conditions whereby the cyanides are oxidized to cyanates.

Systems previously used for this purpose have included a collection or storage tank for the waste water and a reaction tank into which the waste water is transferred for chemical treatment. In these systems, the chemical reagents added to the waste water have been added into the reaction tank from supply containers either by gravity feed or by separate pumps for each reagent and the reaction tank includes a mixing or stirring means for dispersing the reagents throughout the waste water. When gravity feed is used, the containers of hazardous reagents are located above the reaction tank and usually overhead operating personnel where leakage presents a potential safety hazard. Use of separate pumps for each reagent and a separate mixing means adds to the fabrication and maintenance costs of the system and also increases the complexity of the controls required.

SUMMARY OF THE INVENTION

This invention provides a system for chemically treating a waste fluid including a circular storage and a circular reaction tank mounted in spaced relationship on a common base plate, control valves, conduits and pumping means positioned between the tanks, and a vertical panel which extends between and is mounted on the storage tank and the reaction tank and which supports a control panel carrying electrical components for operating and controlling the valves and pumping means. Such an arrangement provides a compact, packaged system.

The invention also provides means for selective coordinated actuation of the control valve means and the conduits and pumping means are arranged in a manner so that a single pumping means can transfer the waste fluid from the storage tank to the reaction tank, recirculate the fluid through the reaction tank to intermix the chemical reagents, and discharge the fluid from the reaction tank after treatment.

The invention further provides an arrangement whereby the chemical reagents are introduced into the suction side of the pumping means so that the chemical reagents can be drawn from their respective containers by the pumping means while transferring, recirculating, or discharging the fluid. Such an arrangement permits the reagent containers to be positioned in a safe location and the reagents to be introduced into the fluid and mixed therein without separate pumping means or separate mixing means.

An object of this invention is to provide an inexpensive, compact system for chemically treating a waste fluid.

Another object of this invention is to provide a waste fluid treatment system having a simplified arrangement for controlling the addition and mixing of the treatment reagents with the waste fluid.

A further object of this invention is to provide such a system wherein a single pumping means is used to transfer the waste fluid to a reaction tank, to recirculate the waste fluid through the reaction tank, and to discharge the fluid from the system after treatment.

A still further object of this invention is to provide a waste fluid treatment system with a simplified means for controlling the addition of the treatment reagents so as to maintain the desired reaction conditions.

Further objects, aspects and advantages of the invention will become apparent upon reviewing the following detailed description and accompanying drawing.

DESCRIPTION OF THE PREFERRED EMBODIMENTS

Figure 1:
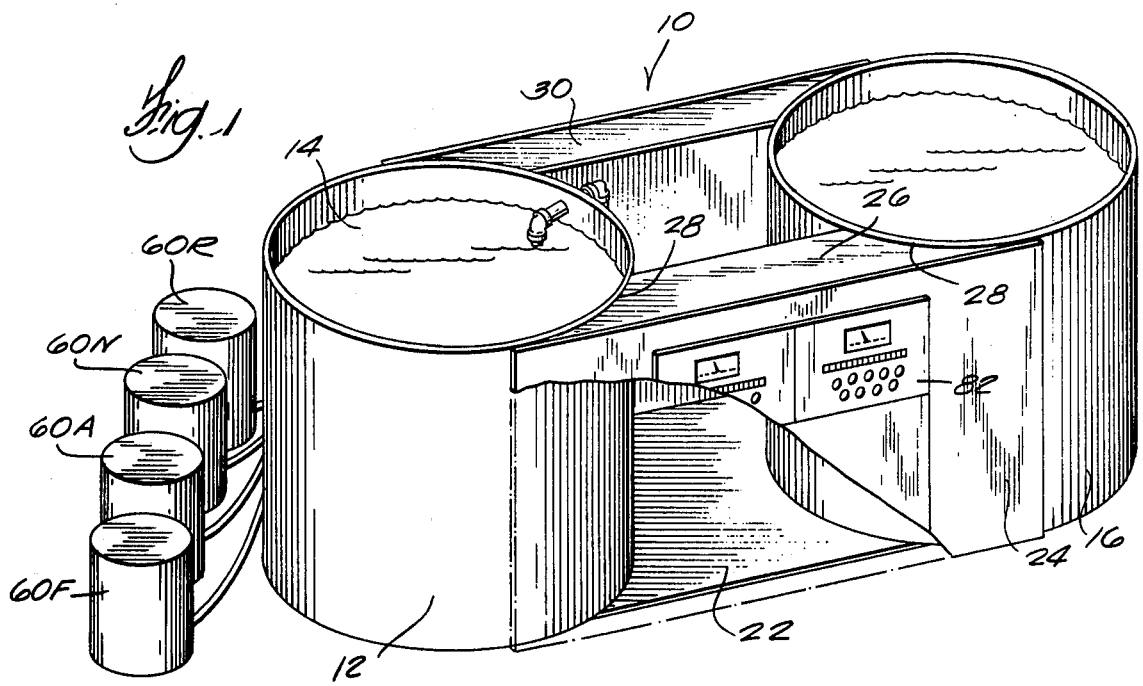
FIG. 1 is a perspective view, partially broken away, of a waste water treatment system embodying various features of the invention.
Figure 2:
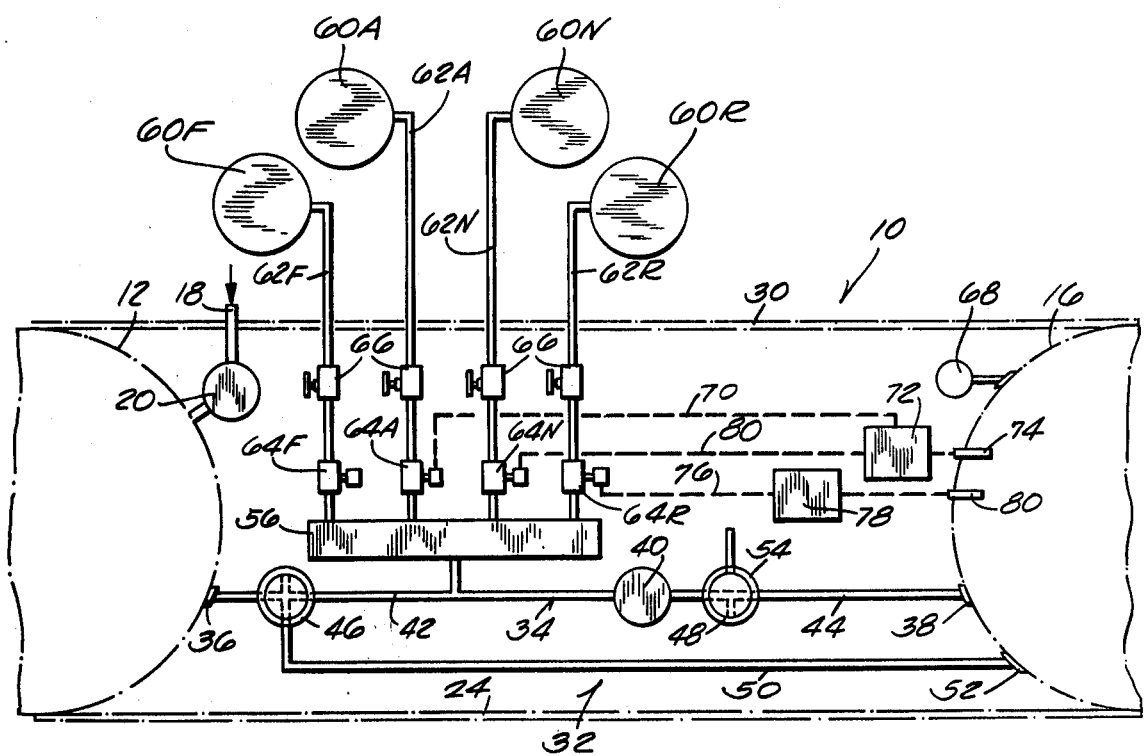
FIG. 2 is a diagrammatic representation of the system shown in FIG. 1 showing the interrelationship of the various components.

Before explaining the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

The drawings illustrate a waste fluid treatment system 10 for treating a waste water from a metal plating process and containing hexavalent chromium. It should be appreciated that the system 10 can be used to treat various types of waste fluids, such as waste water from an anodizing process containing cyanides. The system 10 includes an open-top storage tank 12 for collecting and temporarily storing the waste water 14 from the metal treatment process and an open-top reaction tank 16. The waste water 14 is transferred from the metal plating process into the storage tank 12 through storage tank inlet 18 by a pump 20 or by gravity. The waste water is transferred from the storage tank 12 into the reaction tank 16 for treatment with a reducing reagent and an acid to reduce hexavalent chromium contained in the waste water to trivalent chromium.

In accordance with the invention, the storage tank 12 and the reaction tank 16 are arranged in a manner to provide a compact, unitary or packaged assembly which can be inexpensively fabricated. While various constructions can be employed, in the construction illustrated, the storage tank 12 and the reaction tank 16 are cylindrically shaped with a circular cross section and are suitably mounted, such as by welding, in spaced relationship on a common horizontal, base plate 22 which forms the bottom of both tanks. The storage tank 12 and the reaction tank 16 are constructed from a suitable structural material, such as steel, and are preferably lined with a chemically resistant material, such as polyvinyl chloride, to prevent corrosive attack by the waste water contaminants and/or treatment reagents.

Extending between storage tank 12 and the reaction tank 16 to provide structural support is a vertical panel 24 which is preferably mounted tangentially to both tanks. Extending inwardly from the top margin of the panel 24 is a horizontal flange member 26 having arcuate end sections 28 respectively mounted on a portion of the periphery of the storage tank 12 and the reaction tank 16 to provide further structural strength. Still further structural support is provided by a member 30 extending between and mounted on the storage tank 12 and the reaction tank 16 on the side opposite to the vertical panel 24. With this arrangement, the various structural components can be cut from sheet materials and assembled by welding without the bending operations required by prior art constructions, other than the rolling necessary for forming the cylindrical storage and reaction tanks.

The waste water is transferred from the storage tank 12 into the reaction tank 16 by a transfer system 32 located between the tanks. In accordance with the invention, the transfer system 32 is arranged so that a single pumping means can be used to transfer the waste water from the storage tank 12 to the reaction tank 16, to recirculate the waste water through the reaction tank 16, and to discharge the waste water from the reaction tank after a treatment. While various arrangements can be used, in the construction illustrated, the transfer system 32 includes a transfer pipe or conduit 34 connecting the storage tank outlet 36 to the reaction tank inlet 38, a pump 40 supported on the base plate 22 and connected in the transfer conduit 34 to divide the transfer conduit 34 into an upstream portion 42 and downstream portion 44, a three-way valve 46 located in the upstream portion 42 of the transfer conduit 34, a three-way valve 48 located in the downstream portion 44 of the transfer conduit 34, a recirculating pipe or conduit 50 communicating with the reaction tank outlet 52 and the valve 46, and a discharge pipe or conduit 54 communicating with the valve 48. The pump 40 can be any conventional type, such as an electric motor driven, centrifugal pump, capable of handling the treatment chemicals and the waste water. The conduits 34, 50 and 54 and the valves 46 and 48 are constructed from a chemical resistant material or are lined with a chemical resistant material to prevent attack by the waste water or the treatment chemicals. The valves 46 and 48 are preferably solenoid-operated so that the switching of the transfer system described below can be accomplished automatically.

To transfer the waste water from the storage tank 12 into the reaction tank 16, the valves 46 and 48 are actuated to positions where the storage tank outlet 36 communicates with the reaction tank inlet 38 through the transfer conduit 34 and the pump 40, and the recirculating conduit 50 and the discharge conduit 54 are closed. The pump 40 is then operated to transfer the desired quantity of waste water to be treated into the reaction tank 16. To circulate the waste water through the reaction tank 16, the valves 46 and 48 are actuated to positions where the reaction tank outlet 52 communicates with the reaction tank inlet 38 through the recirculating conduit 50, transfer conduit 34 and the pump 40, and the discharge conduit 54 and the storage tank outlet 36 are closed. To discharge the waste water from the reaction tank 16, the valves 46 and 48 are actuated to positions where the reaction tank outlet 52 communicates with the discharge conduit 54 through the recirculating conduit 50, the transfer conduit 34 and the pump 40, and the storage tank outlet 36 and the reaction tank inlet 38 are closed.

Also in accordance with the invention, the treatment system 10 is arranged so that the chemical reagents for treating the waste water are introduced into this system by the pumping action of the pump 40. While various arrangements can be employed, in the construction illustrated, a manifold or suction chamber 56 is connected in communication with the upstream portion 42 of the transfer conduit between the valve 46 and the pump 40 and containers 60A, 60F, 60N, 60R containing the various chemical reagents for treating the waste water are connected in communication with the suction chamber 56 by respective conduits 62A, 62F, 62N and 62R. Container 60A contains an acid, such as sulfuric or hydrochloric acid, container 60F contains a flocculating agent, container 60N contains a neutralizing agent, such as sodium hydroxide, and container 60R contains a reducing agent, such as sodium metabisulfite.

Normally-closed, solenoid operated valves 64A, 64F, 64N and 64R disposed in respective conduits 62A, 62F, 62N and 62R are actuated open to connect the respective reagent containers in communication with the suction chamber 56 so that the desired reagent is drawn into the system by the pump 40. A manually-adjustable metering valve 66 disposed in each of the conduits 62A, 62F, 62N and 62R controls the flow rate of respective reagent into the system. One or more reagents can be added to the waste water when the pump 40 is operating during transfer or recirculation, or even during discharge if desired. The turbulence created by the pump 40 assists in mixing the reagents with the waste water.

In actual practice, the reagent containers can be vented, 55-gallon drums which are positioned in a safe location remote from the treatment system 10 as shown in FIG. 1 and the reagent flow control and shutoff valves are preferably mounted between the storage tank 12 and the reaction tank 16.

Waste water is first transferred from the storage tank 12 into the reaction tank 16 with the valves 64A and 64R open so that sufficient amounts of the acid and the reducing agent are introduced into the system to initiate the desired reducing reaction. After the reaction tank 16 is filled to a predetermined level, as indicated by a level sensing device 68, the three-way valve 46 is actuated to the recirculating position described above and the waste water solution is recirculated to obtain a thorough intermixing of the acid and the reducing agent. As the reduction reaction proceeds during recirculation, additional acid is added to maintain the waste water solution at a predetermined acidic pH level, e.g. a pH of 2.5, so that the reaction is carried out in the presence of an acid solution and the reducing agent is added to maintain the redox potential of the waste water solution at a predetermined level necessary to insure that all the hexavalent chromium in the waste water is reduced to trivalent chromium.

Although various control arrangements can be employed for adding these reagents, in the construction illustrated, the solenoid-operated valve 64A is operatively connected via signal line 70 to a conventional pH analyzer/controller assembly 72 which is preset at the pH at which the waste water solution is to be maintained during the reduction reaction. The pH analyzer/controller assembly 72 receives a pH measurement signal from a probe 74 mounted in the reaction tank 16. When the measured pH of the waste water solution in the reaction tank 16 is above the set point, the pH analyzer/controller assembly 72 transmits a signal via the signal line 70 to open valve 64A so that the acid is drawn from the container 60A by the pump 40 during recirculation into the system until the pH of the waste water solution is reduced to the preset level.

The solenoid-operated valve 64R is operatively connected, via a signal line 76, to a conventional oxidation-reduction potential (ORP) analyzer/controller assembly 78 which is preset at the redox potential necessary for reduction of the hexavalent chromium to trivalent chromium. The ORP analyzer/controller assembly 76 receives a redox potential measurement signal from a probe 80 mounted in the reaction tank 16. When the measured redox potential of the waste water solution varies from the preset level, ORP analyzer/controller assembly 78 transmits a signal via the signal line 76 to open the valve 64R so that the reducing agent is drawn into the system from the container 60R by the pump 40 during recirculation until the redox potential of the waste water solution is adjusted to the preset level.

After a predetermined reaction time required to reduce substantially all of the hexavalent chromium in the waste water to trivalent chromium, the valves 64A and 64R are closed and the valve 64N is opened so that only the neutralizing agent is added to the recirculating waste water solution. A sufficient amount of the neutralizing agent is added to increase the pH of the waste water solution to a predetermined level, e.g. a pH of 8.2, where various metal ions in the waste water, such as cadmium and zinc, will readily precipitate in a subsequent treating step after being discharged from the system. For example, the treated waste water can be transferred to a clarifier for removal of various precipitable constituents. In the construction illustrated, the pH analyzer/controller assembly 72 also has a neutralization set point. During the neutralizing step, the pH analyzer/controller assembly 72 receives a pH measurement signal from the probe 74 and transmits a signal via a signal line 80 to open the solenoid-operated valve 64N until the pH of the waste water solution reaches the level of the neuralization set point.

After neutralization has been completed, the valve 48 is actuated to the discharge position described above and the treated and neutralized waste water is discharged from the system through the discharge conduit 54. If desired, a flocculating agent which promotes precipitation of the various ions in the waste water can be added to the discharging waste water from the container 60F by opening the valve 64F.

The operation of the pump 40 and the various valves can be controlled manually, but is preferably automatically controlled by a programmer (not shown) including switching means which is operatively connected in a logic circuit so as to sequentially energize the pump and the various valves to effect the transfer, recirculation reagent addition and discharging steps described above. Since various circuitry arrangements can be used to accomplish these functions, a detailed description has been purposely omitted for the sake of brevity.

A control panel 82 carrying the pH and analyzer/controller assembly 72, the ORP analyzer/controller assembly 78, the programmer, a power supply, the electrical circuitry, and various relays required for operating the pump and the solenoid-operated valves is mounted on the vertical panel 24.

As mentioned above, the treatment system 10 can be used to treat a waste water from an anodizing process containing cyanides. When used for this purpose, a liquid oxidizing agent, such as sodium hypochlorite, is used in place of the reducing agent, a base is added to the waste water during the transfer and recirculation steps in place of an acid so that the desired oxidation reaction is carried in the presence of a basic solution, and an acid is added during the neutralization step in place of a base to adjust the pH to desired level for subsequent treatment. Also, the settings of the pH analyzer/controller assembly and the ORP analyzer/controller assembly are adjusted to the appropriate levels to obtain the desired reaction conditions. Otherwise, the system is arranged and operated in the same manner as described above.

Various of the features of the invention are set forth in the following claims:

I claim:

1. A system for treating a waste fluid containing a chemically reactive substance comprising a storage tank including a fluid outlet, a reaction tank including a fluid inlet and a fluid outlet, first conduit means connecting said storage tank outlet and said reaction tank inlet in fluid communication, a pump located in said first conduit means and dividing said first conduit means into an upstream portion and a downstream portion, second conduit means connecting said reaction tank outlet and said first conduit means upstream portion in fluid communication, third conduit means communicating with said first conduit means downstream portion for discharging fluid from the system, first valve means connected between said first conduit means downstream portion and said third conduit means for selectively controlling fluid flow from said first conduit means downstream portion into said reaction tank and from said first conduit means downstream portion into said third conduit means, second valve means connected between said first conduit means upstream portion and said second conduit means for selectively controlling fluid flow from said storage tank to the upstream side of said pump and from said second conduit means to the upstream side of said pump, means for selective, coordinated actuation of said first and second valve means so that said pump selectively transfers the fluid from said storage tank through said first conduit means including said pump and into said reaction tank, recirculates the fluid from said reaction tank, through said second conduit means, and through first conduit means including said pump and into said reaction tank, and discharges the fluid from said reaction tank through said second conduit means, through said first conduit means including said pump, and through said third conduit, means for containing a treatment reagent for the waste fluid, and means for selectively connecting said reagent container means in communication with said first conduit means upstream portion between said second valve means and said pump whereby pumping action of said pump draws the treatment reagent into the system.

2. A system according to claim 1 wherein said waste fluid is a waste water from a metal treatment process and said reagent containing means includes separate means containing a first reagent for adjusting the pH of the waste water and including a fourth conduit means for introducing the first reagent into said first conduit means upstream portion between said first valve means and said pump, separate means containing a second reagent for reducing or oxidizing a chemically reactive substance in the waste water and including fifth conduit means for introducing the second reagent into said first conduit means upstream portion between said first valve means and said pump, and said system further includes means for measuring the pH of the waste water and producing a first signal when the pH of the waste water varies from a predetermined level, means for measuring the redox potential of the waste water and producing a second signal when the redox potential of the waste varies from a predetermined level, third and fourth valve means disposed in said fourth and fifth conduit means, respectively, means operatively connected to said third valve means for opening said third valve means in response to the first signal, and means operatively connected to said fourth valve means for opening said fourth valve means in response to the second signal.

3. A system according to claim 2 including separate means containing a neutralizing agent and including sixth conduit means for introducing the neutralizing agent into said first conduit means upstream portion between said first valve means and said pump, fifth valve means disposed in said sixth conduit means, and means operatively connected to said fifth valve means for opening said fifth valve means so as to introduce an amount of the neutralizing agent into the waste water, after treatment with the first and second reagent, to adjust the pH of the treated waste water to a predetermined level.

* * * * *